US007735363B2

(12) United States Patent
Mainville

(10) Patent No.: US 7,735,363 B2
(45) Date of Patent: Jun. 15, 2010

(54) AIRCRAFT ENGINE PRE-DRESSING UNIT FOR TESTING FACILITY

(75) Inventor: Daniel Mainville, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 166 days.

(21) Appl. No.: 11/765,689

(22) Filed: Jun. 20, 2007

(65) Prior Publication Data

US 2008/0314134 A1 Dec. 25, 2008

(51) Int. Cl.
*G01M 15/14* (2006.01)
(52) U.S. Cl. .................................................. 73/116.03
(58) Field of Classification Search ............... 73/116.02, 73/116.03, 116.04, 112.01, 112.03, 112.04, 73/112.05
See application file for complete search history.

(56) References Cited

U.S. PATENT DOCUMENTS

| 3,552,196 | A | * | 1/1971 | Schrom ................... 73/116.02 |
| 1,237,372 | A | | 6/1971 | Weekley |
| 3,695,098 | A | * | 10/1972 | Kirkland, Jr. ............ 73/116.01 |
| 3,759,091 | A | | 9/1973 | Reimer |
| 4,328,703 | A | | 5/1982 | McClure et al. |
| 4,788,855 | A | | 12/1988 | Laskody |
| 5,170,662 | A | | 12/1992 | Brault et al. |
| 5,259,234 | A | | 11/1993 | Keller et al. |
| 5,293,775 | A | * | 3/1994 | Clark et al. ............... 73/116.03 |
| 5,396,791 | A | | 3/1995 | Mollmann et al. |
| 5,396,793 | A | * | 3/1995 | Colletti ................... 73/116.03 |
| 5,515,712 | A | * | 5/1996 | Yunick ............................ 73/9 |
| 5,547,304 | A | | 8/1996 | Cascio |
| 5,653,351 | A | | 8/1997 | Grout et al. |
| 6,092,621 | A | | 7/2000 | Kinzie |
| 6,253,600 | B1 | * | 7/2001 | Sondey .................... 73/116.02 |
| 7,000,460 | B1 | * | 2/2006 | Cline et al. ............... 73/116.03 |
| 2001/0039832 | A1 | * | 11/2001 | Sondey ........................ 73/116 |
| 2003/0014960 | A1 | * | 1/2003 | Lawlor ....................... 60/39.35 |
| 2003/0177824 | A1 | * | 9/2003 | Parfitt et al. ................ 73/118.2 |
| 2006/0201160 | A1 | * | 9/2006 | Richards ....................... 60/792 |
| 2008/0060434 | A1 | * | 3/2008 | Kershaw ....................... 73/455 |
| 2008/0250769 | A1 | * | 10/2008 | Wagner et al. ............. 60/39.24 |

FOREIGN PATENT DOCUMENTS

GB 2 364 064 7/2003

OTHER PUBLICATIONS

Products and Services, Aerospace Testing International, Dec. 2006.
"Dallas Airmotive Expands PW300 and PW500 Service" by David A. Lombardo, Dec. 1, 2005, Maintenance and Medifications, Dassault.Falcon.

* cited by examiner

*Primary Examiner*—Eric S McCall
(74) *Attorney, Agent, or Firm*—Ogilvy Renault LLP

(57) ABSTRACT

A turbofan text cell pre-dressing unit that enables the installation of the engine in a text cell in minimal time is provided.

14 Claims, 16 Drawing Sheets

AIRCRAFT ENGINE PRE-DRESSING UNIT FOR TESTING FACILITY

TECHNICAL FIELD

The invention relates to a gas turbine engine pre-dressing unit for an aircraft gas turbine engine testing facility.

BACKGROUND OF THE ART

Aircraft gas turbine engines are normally subjected to at least one "pass-off" operational text, after production and before they are shipped, to ensure proper operation of each engine. The pass-off test is typically conducted within a test cell with the engine heavily instrumented to measure and record relevant parameters. Accordingly, each engine must be prepared or "dressed" with the necessary test equipment, such as accessories (e.g. starter motor), instruments (e.g. sensors) and services (e.g. fuel, oil supplies) that are required for the testing and operation of the engine within the test cell. Once the pass-off test is completed, the engine must then be "undressed" before it is packaged and shipped.

Dressing the engine is a time-consuming and a labor-intensive activity, due to the sheer magnitude of instruments used in testing and the sensitivity of those instruments to shock and mishandling. An operator locates, assembles and connects to the engine the specific test equipment, such as accessories, instruments and services that are required for testing the particular model of engine. This process is a significant source of downtime for the test cell and requires a significant amount of material handling and storage. It is also prone to operator error. Improvement is needed.

SUMMARY

According to one broad aspect, there is provided a pre-dressing unit for an aircraft turbofan engine testing, the pre-dressing unit comprising: a support frame including an engine mount; an intake duct supported by the support frame and configured to mount to an intake end of the turbofan engine; an exhaust duct supported by the support frame and configured to mount to an exhaust end of the turbofan engine; an engine-side data connector mounted to the support frame and having a functional data interface comprising a plurality of engine-side data connections; and equipment associated with the operation and testing of the engine, said equipment including test instruments mounted to the exhaust duct and functionally connected to a corresponding engine-side connection on the engine-side data connector for data communication therewith.

According to another aspect, there is provided a pre-dressing unit for an aircraft gas turbine engine testing, the pre-dressing unit comprising: a support frame; an intake duct supported by the support frame for coupling to an intake end of the gas turbine engine; an exhaust duct supported by the support frame for coupling to an exhaust end of the gas turbine engine; an engine-side connector structurally attached to the support frame and connected for data communication with test equipment associated with the operation and testing of the engine, the engine side-connector having a connecting interface including both data connectors and structural connectors configured to be interfaced all at once in a single operation with corresponding data connectors and structural connectors of a test cell structure.

According to a further aspect, there is provided a connector assembly for a turbofan engine testing facility, the connector assembly comprising: an engine-side connector structurally attached to the gas turbine engine, having a functional interface comprising a plurality of engine-side connections functionally connected to equipment associated with the operation and testing of the engine; and a mating test-side connector associated with the testing facility comprising a plurality of corresponding test-side connections; the engine-side connector and the test-side connector having cooperating guiding mechanism configured to structurally co-operate and restricting relative motion between the engine-side connector and the test-side connector along an engagement axis while establishing alignment of the engine-side connections with the test-side connections as the engine-side connector and the test-side connector are brought together for connection; and the engine-side connector and the test-side connector having a cooperating locking mechanism to releasably lock the engine-side connector to the test-side connector along the engagement axis.

According to a still further general aspect, there is provided a pre-dressing unit for an aircraft turbofan engine testing, the pre-dressing unit comprising; a support frame including an engine mount; an intake duct supported by the support frame and configured to mount to an intake end of the turbofan engine; an exhaust duct supported by the support frame and configured to mount to an exhaust end of the turbofan engine; an engine-side data connector mounted to the support frame and having a functional data interface comprising a plurality of engine-side data connections; and equipment associated with the operation and testing of the engine, said equipment including an engine oil pressure regulator carried by the support frame and functionally connected to a corresponding engine-side connection on the engine-side data connector for allowing adjustment of oil pressure during engine testing operation without having to stop the engine.

DESCRIPTION OF THE DRAWINGS

Reference is now made to the accompanying Figures, in which.

DETAILED DESCRIPTION OF THE PREFERRED EMBODIMENTS

Figure 1:
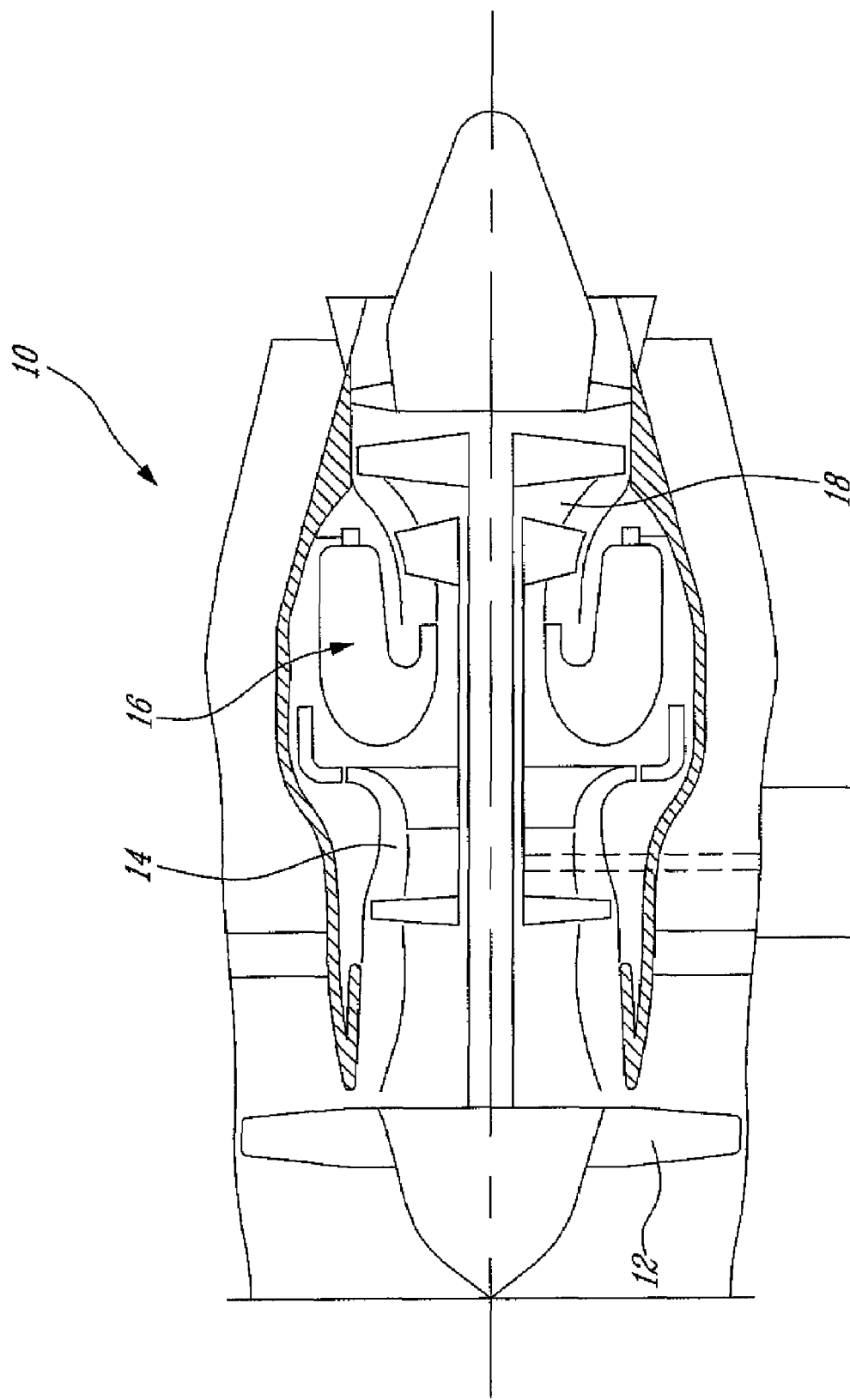
FIG. 1 is a schematic axial cross-section view of a gas turbine engine.

FIG. 1 illustrates a turbo-fan engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. It will be understood however that the invention is equally applicable to other types of gas turbine engines, such as a turbo-shaft, a turbo-prop, or auxiliary power units.

Figure 2:
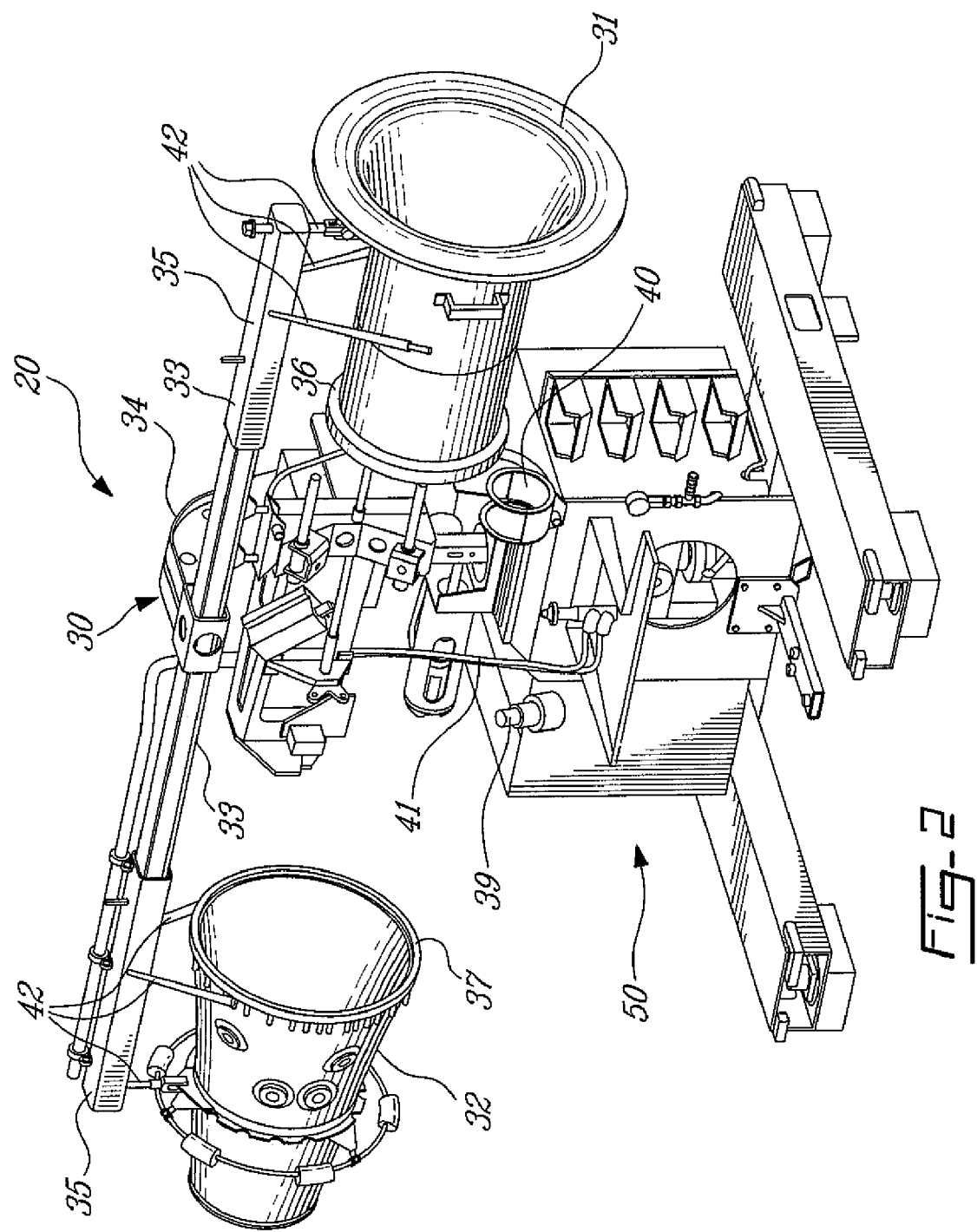
FIG. 2 is an isometric view showing a front side of a gas turbine engine pre-dressing unit.

FIG. 2 shows an aircraft gas turbine pre-dressing unit (in this case, configured for a turbofan engine), shown generally at 20, that can be used to prepare engine 10 for a pass-off test within a test cell (not shown). As will be seen hereinafter, the pre-dressing unit 20 is preferably adapted to be all-inclusive such that it comprises preferably all the test equipment, such as accessories, instruments and services (described further below) that are required for pre-dressing the engine 10 prior to testing in the test cell. The mobility of the unit 20 allows the pre-dressing to be readily done outside of the test-cell, i.e. while the test cell is in use, thus reducing test cell downtime.

Figure 8:
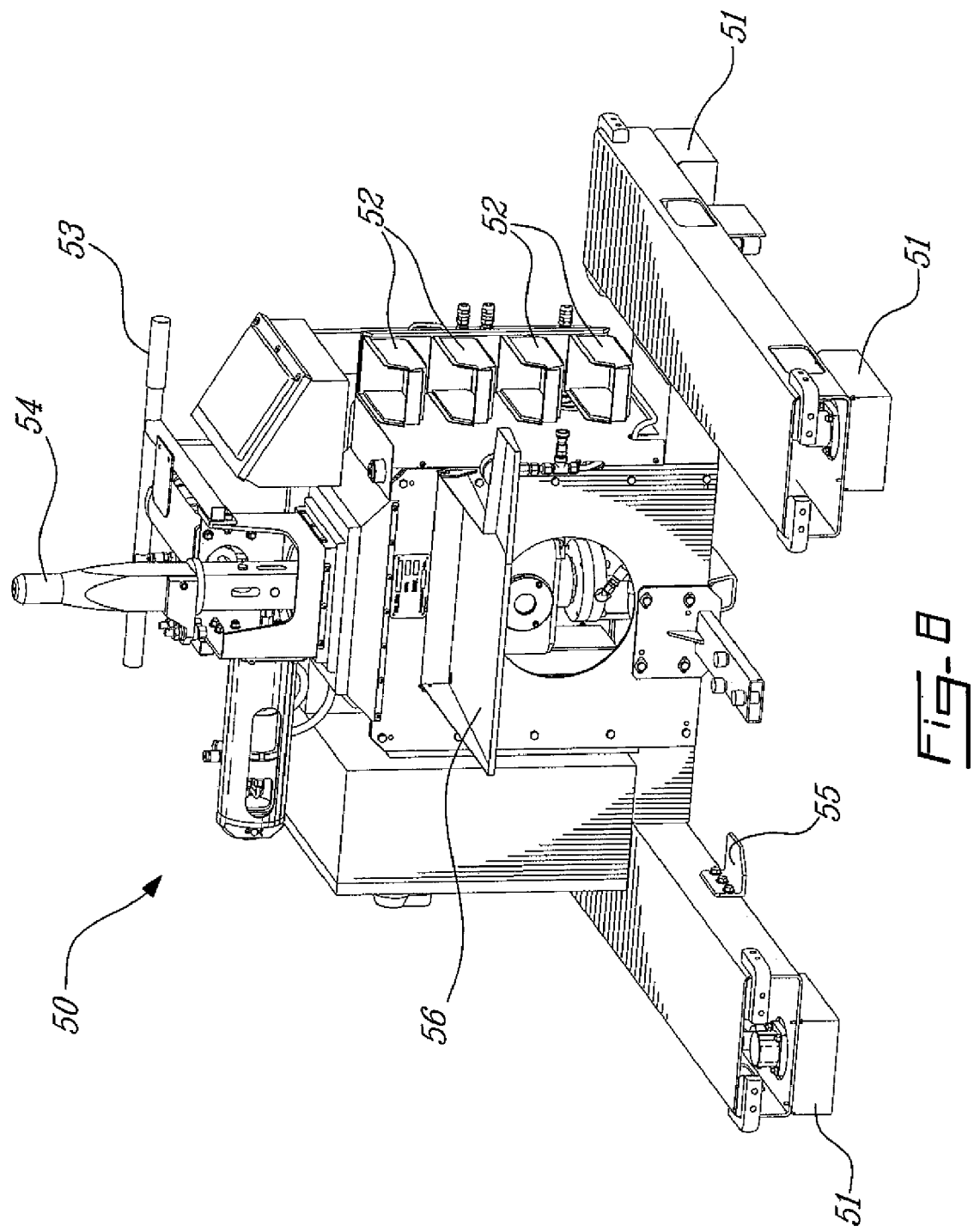
FIG. 8 is an isometric view of a base of the pre-dressing unit of FIG. 2.

The pre-dressing unit 20 comprises a support frame 30 (FIG. 9) that is removably mounted on a mobile base 50 (FIG. 8). The support frame 30 comprises a central support member 34 at an upper end of which a horizontal rail 33 is affixed. An instrumented intake duct 31 and an instrumented exhaust duct 32 are permanently mounted, via respective support members 42, to separate sleeves 35 which are independently slidably supported on the rail 33 in a substantially axial alignment. The sleeves 35 allow for the intake duct 31 and the exhaust duct 32 to be moved axially along the rail 33 either towards or away from each other. A locking mechanism (not shown) can be provided to releasably lock the sleeves 35 in place along the rail 33. The pre-dressing unit 20 also comprises preferably all the test equipment required for operating and testing the engine 10. The intake and exhaust ducts 31 and 32 are preferably instrumented with probes and sensors to obtain intake and exhaust temperature and pressure feedback while the engine 10 is being tested. The intake duct 31 is also typically equipped with an intake guard 38 (see FIG. 3). The test equipment mounted to unit 20 also includes an engine oil pressure regulator 39 (described further below), a starter 40, an automatic oil filing system 41 and fuel supply line (not shown). The pre-dressing unit 20 may further include various other test equipment (not shown) predisposed on or mounted to unit 20, such as engine temperature and pressure sensors and other equipment for operation, testing and evaluation of gas turbine engines.

Figure 3:
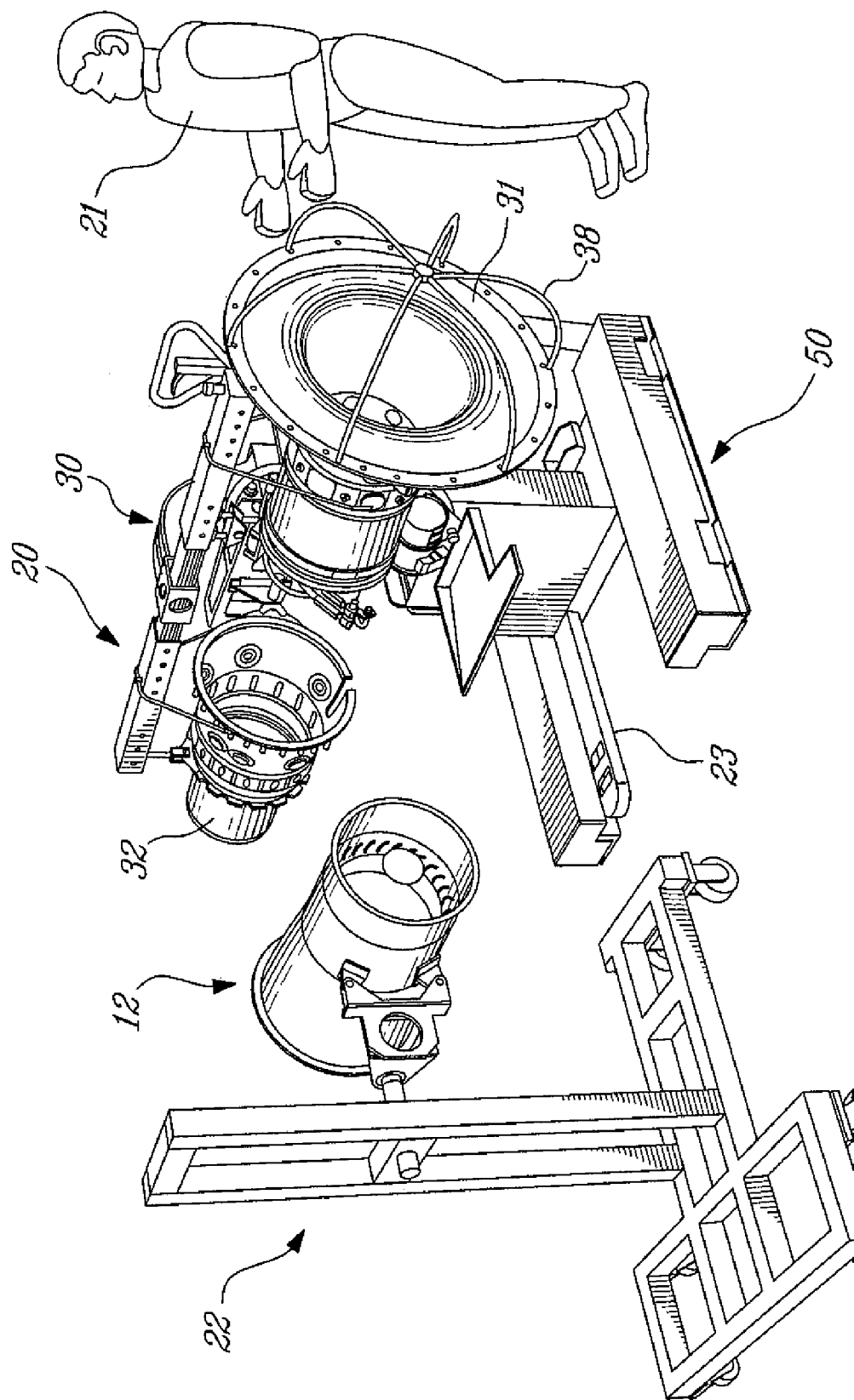
FIG. 3 is an isometric view showing a gas turbine engine being transferred from a production stand to a gas turbine engine pre-dressing unit.

FIG. 3 shows an operator 21 in the process of transferring the engine 10 from a build stand 22, on which the engine 10 is assembled within the production facility, to the pre-dressing unit 20. The operator 21 transfers the engine 10 from the build stand 22 to the pre-dressing unit 20 and then prepare or dress the engine 10 on the pre-dressing unit 20 before transporting it to the test cell using a floor transport system 23 engageable with mobile base 50.

Figure 4:
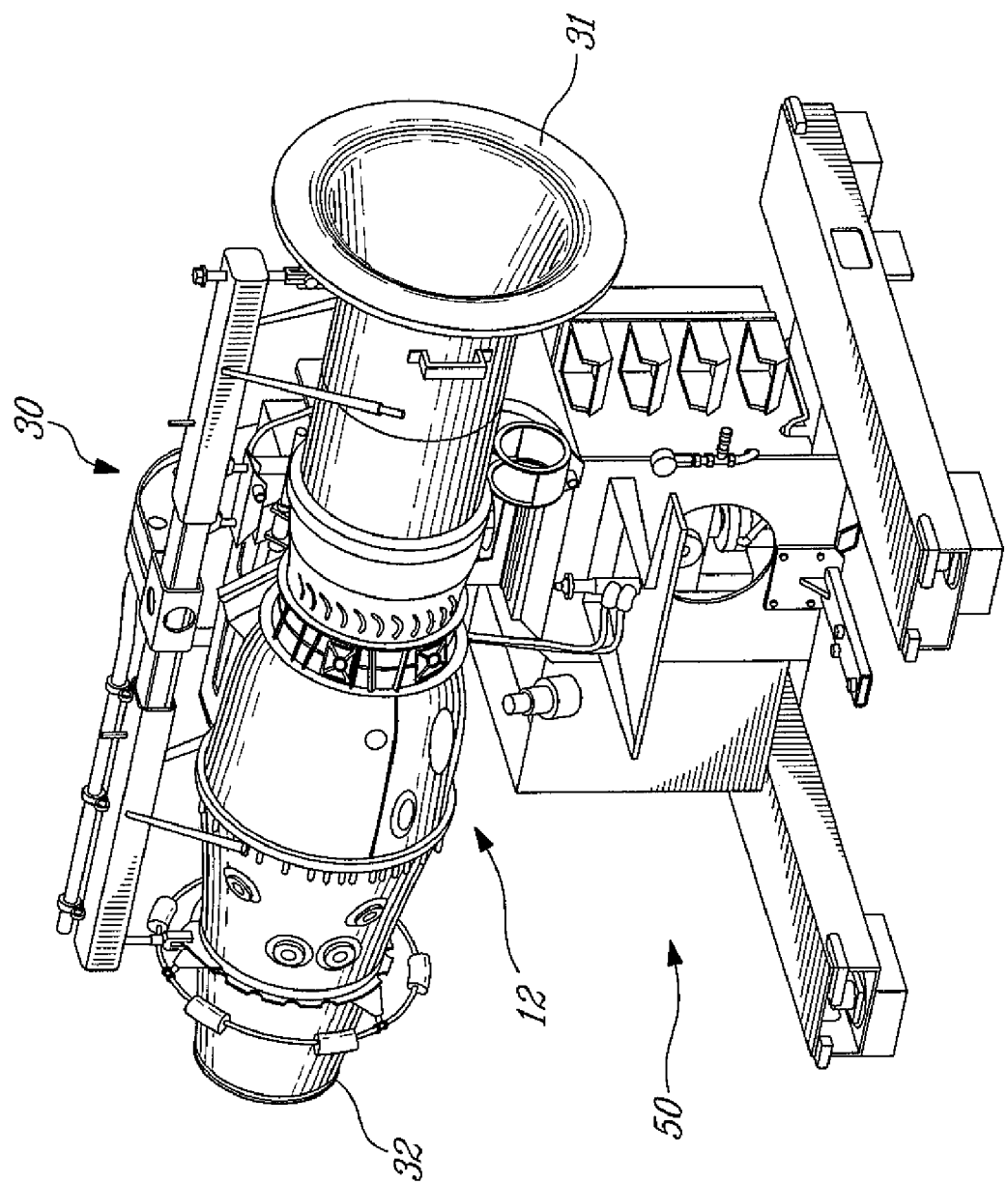
FIG. 4 is an isometric view showing the front side of the pre-dressing unit of FIG. 2 with a gas turbine engine mounted thereon.
Figure 5:
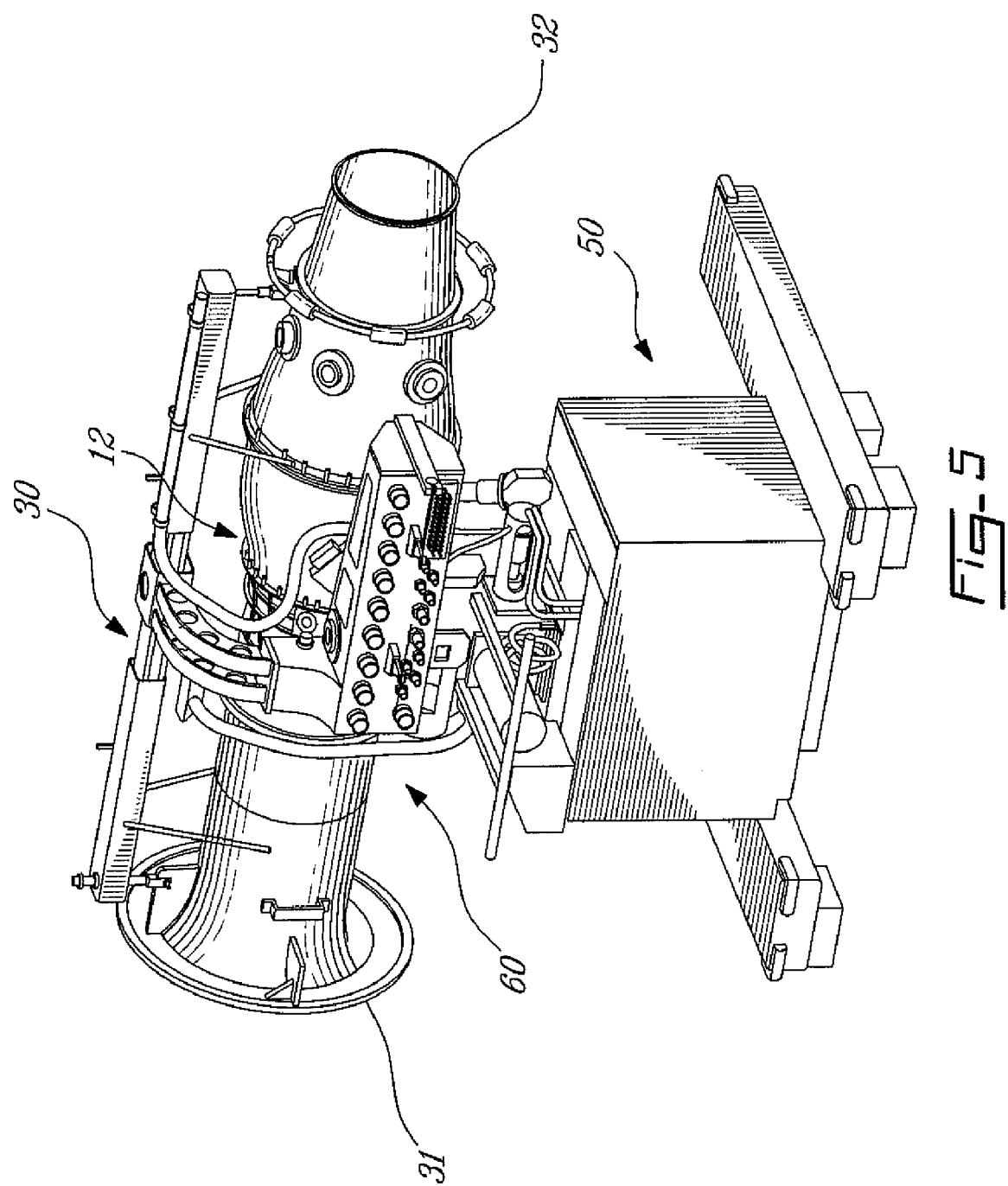
FIG. 5 is an isometric view showing a back side of the pre-dressing unit of FIG. 2 with a gas turbine engine mounted thereon.
Figure 6:
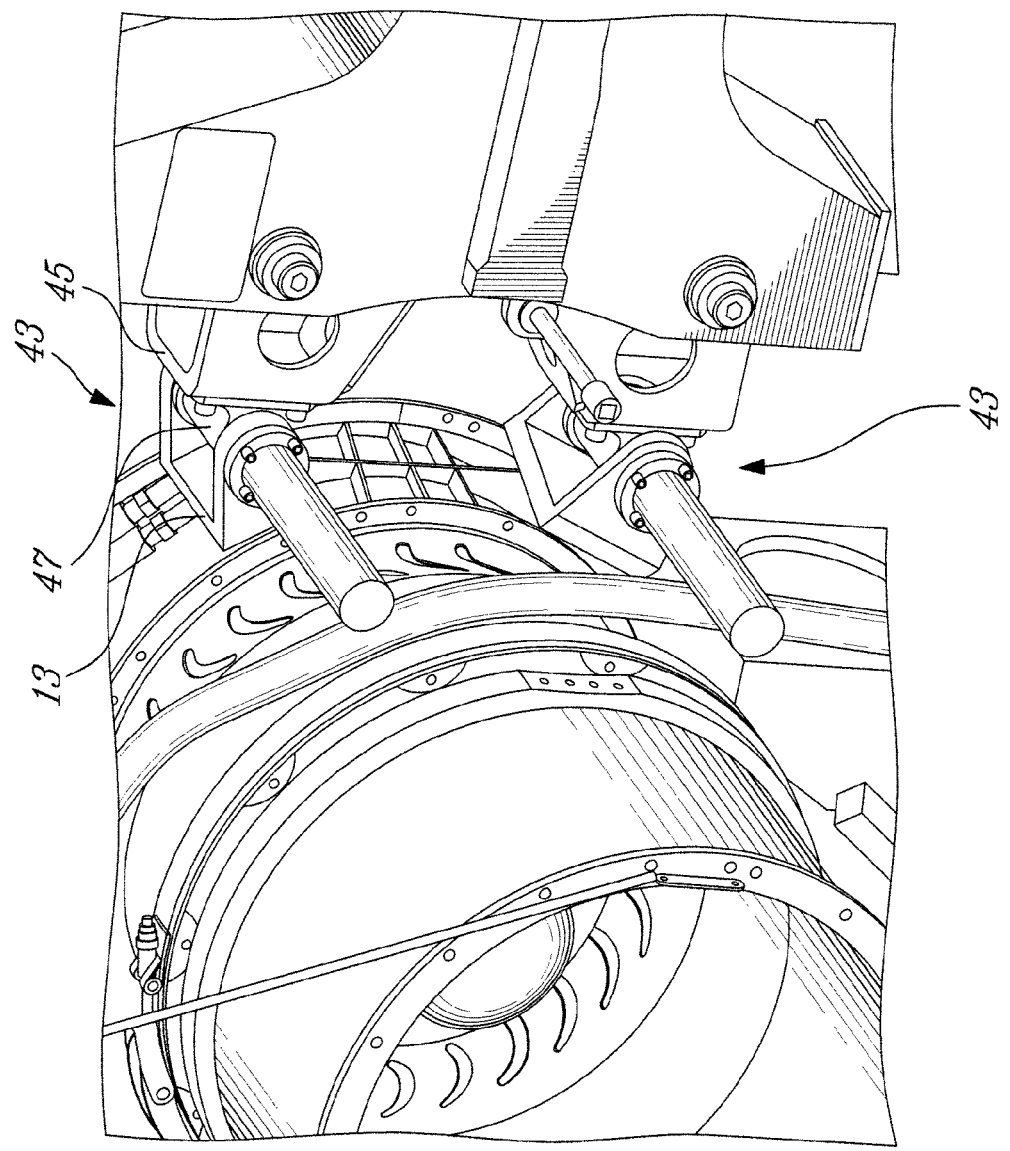
FIG. 6 is an enlarged isometric view of front engine mounts.
Figure 7:
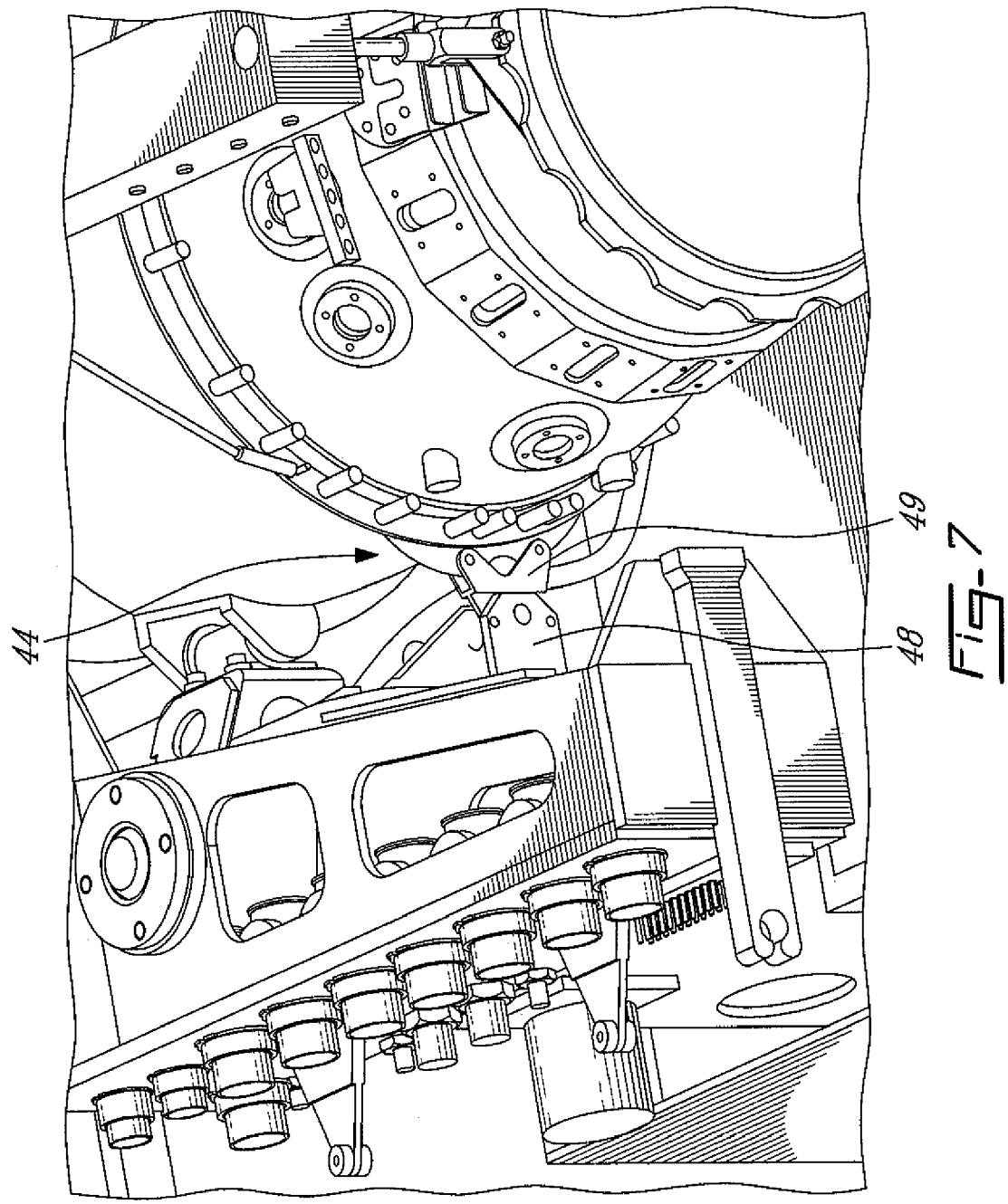
FIG. 7 is an enlarged isometric view of a rear engine mount.

FIGS. 4 and 5 show the pre-dressing unit 20 on which the engine 10 has been mounted. During installation of the engine 10 on the pre-dressing unit 20, the intake duct 31 and exhaust duct 32 are moved apart from each other so as to allow the engine 10 to be inserted between them. The engine 10 is first secured to the support frame 30 via two front engine mounts shown generally at 43 in FIG. 6 and a rear engine mount shown generally at 44 in FIG. 7. The front engine mounts 43 each comprise a front bracket 45 affixed to the support frame 30, on which a holder 47 is secured. The holder 47 comprises an aperture (not shown) for receiving a locking pin (not shown) that interlocks a front engine bracket 13 secured to the engine 10 to the holder 47. The rear engine mount 44 comprises a rear bracket 48 that is affixed to the support frame 30 and a link 49 that is secured to the rear bracket 48. The link 49 is then secured to the engine.

Once the engine 10 has been mounted to the support frame 30, the intake duct 31 and exhaust duct 32 are then moved towards each other and coupled to the intake and exhaust ends of the engine 10 respectively. The intake duct 31 is coupled to the engine 10 via an intake duct flange 36 and the exhaust duct 32 is coupled to the engine via an exhaust duct flange 37.

Once the intake duct 31 and the exhaust duct 32 have been coupled to the engine 10, the test equipment mounted to the unit 20, including the engine oil pressure regulator 39, and the starter 40, the automatic oil filling system 41 and the fuel supply line (not shown) are connected to the engine 10.

As mentioned hereinabove, the intake duct 31 and exhaust duct 32 are also pre-instrumented so that only connections to the engine 10 must be made. This further increase the efficiency of the pre-dressing process. Consequently, the engine 10 can be pre-dressed and made ready for testing in a very short period of time and typically have a pre-dress time of less than 35 minutes and test cell installation time of less than 5 minutes.

The base 50 of the pre-dressing unit 20 is shown in FIG. 8 and comprises many features that facilitate the task of pre-dressing the engine 10 and also has a relatively small footprint which requires a minimal amount of floor space. The base 50 comprises floor pads 51 for resting the pre-dressing unit 20 on a floor but also has brackets 55 that facilitate the transport of the pre-dressing unit 20 using floor transport system 23. The base 50 also comprises a handle 53 and a supporting post 54 on which the supporting frame 30 can be removably mounted. The base 50 further comprises a shelf 56 and storage boxes 52 for storing fasteners, spare components, sensors or the like.

Figure 9:
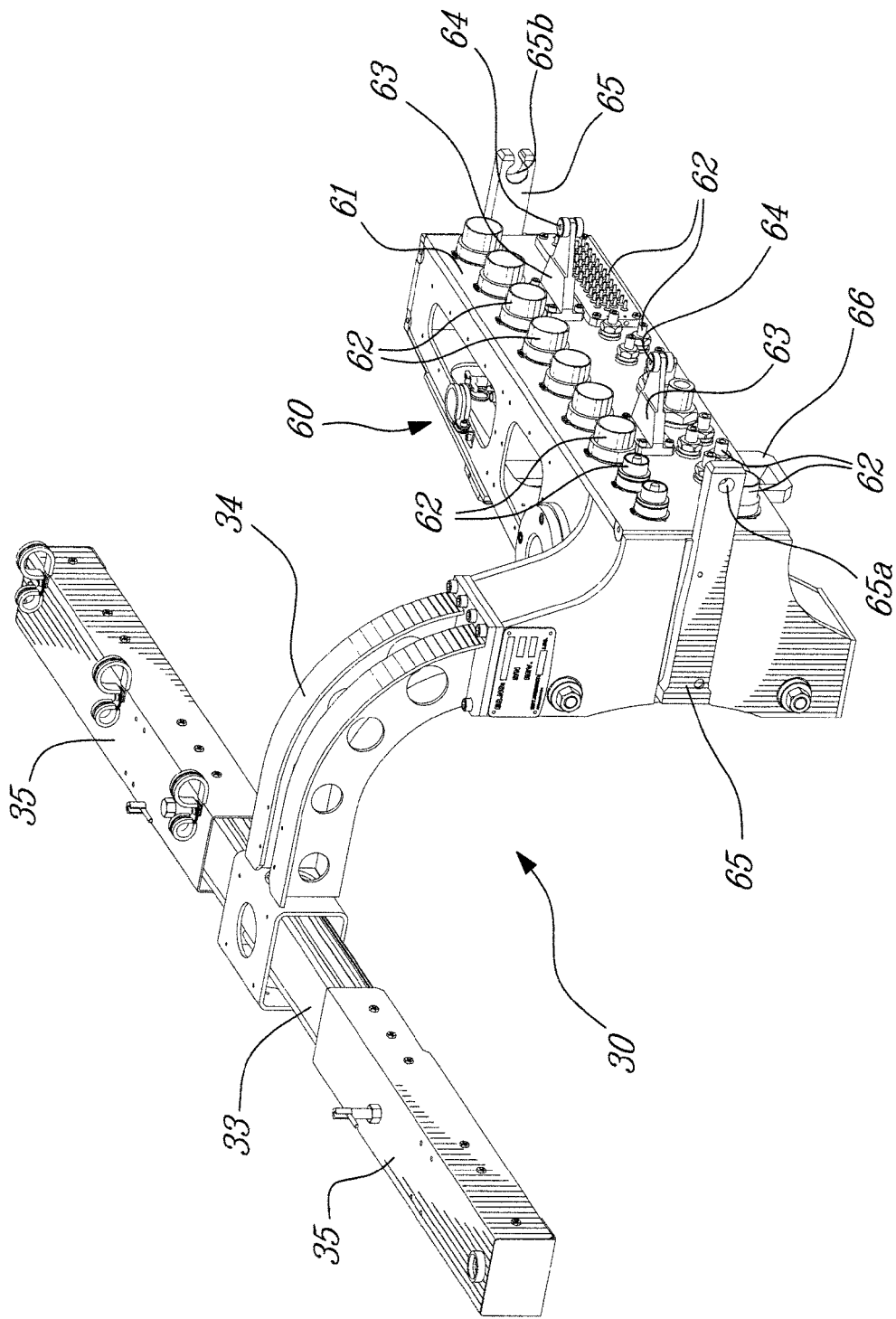
FIG. 9 is an isometric view of a support frame and engine-side connector of the pre-dressing unit of FIG. 2.
Figure 10:
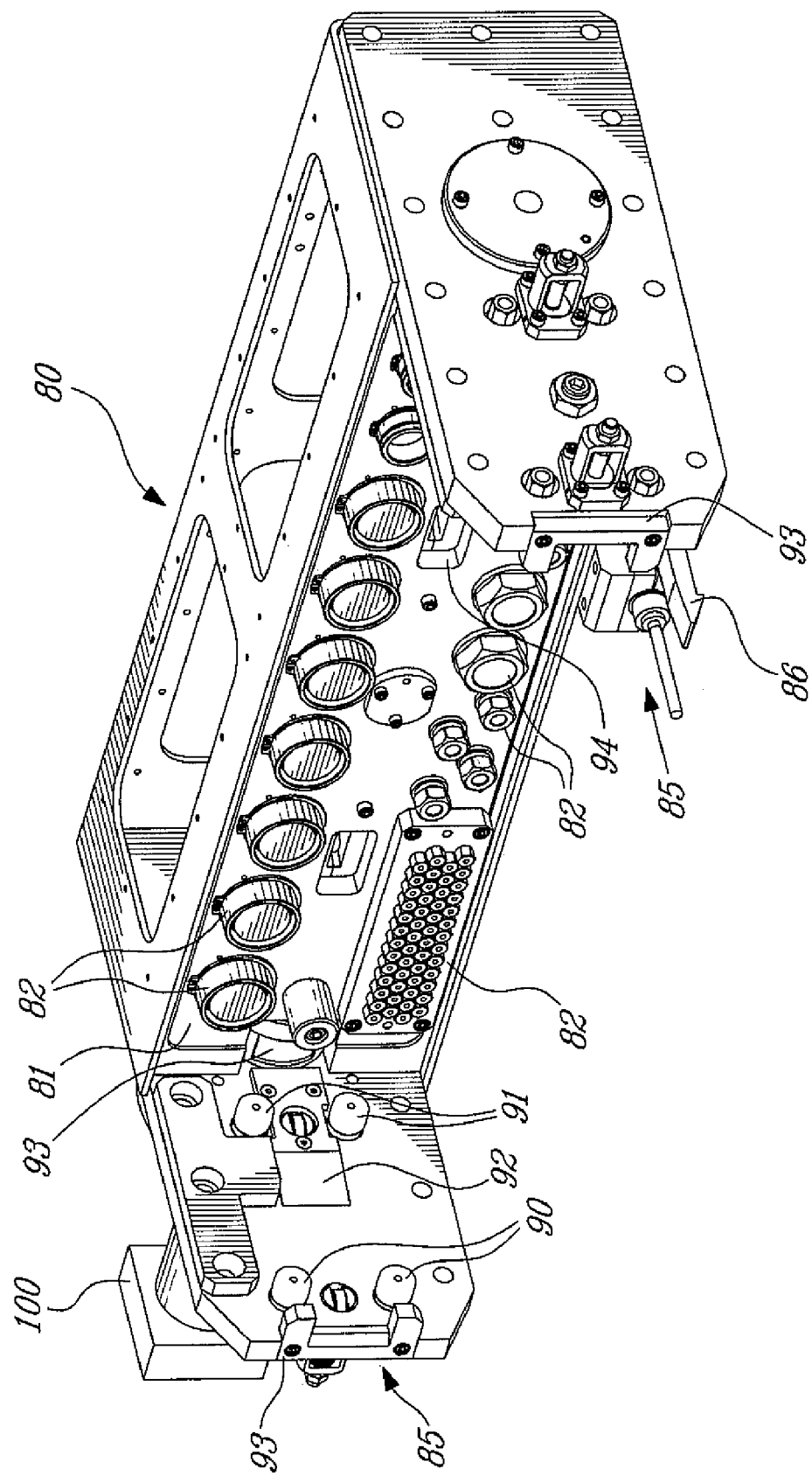
FIG. 10 is an isometric view of a test-side connector.
Figure 11:
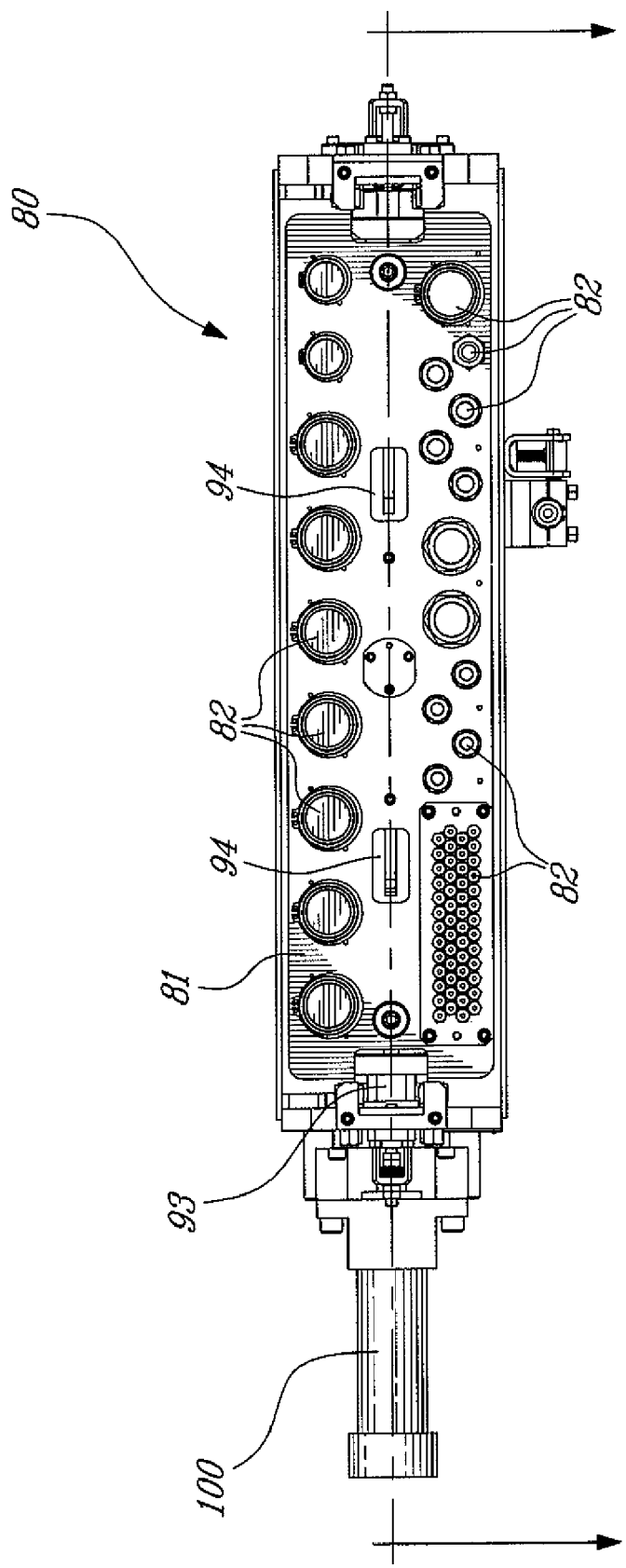
FIG. 11 is a front view of the test-side connector of FIG. 10.

As seen in FIGS. 5 and 9, the support frame 30 comprises an engine-side connector generally shown at 60. The engine-side connector 60 preferably provides a unitary functional interface for all test equipment associated with the engine 10. For example, the engine-side connector 60 provides a functional interface to the oil filling system 41 and the fuel supply line, and, electrical connections to the engine oil pressure regulator 39, the starter 40 and other sensors or instruments required for the operation and testing of the engine 10. This allows the engine-side connector 60 to be connected to a corresponding test-side connector generally shown at 80 in FIG. 10, within the test-cell and transfer the operation of all the test equipment associated with the engine 10 to the test cell into one single connector. The combination of the engine-side connector 60 and the test-side connector 80 is referred below as a connector assembly.

In reference to FIG. 9, the engine-side connector 60 comprises an engine-side connector face 61, a plurality of engine-side connections 62 that are disposed within the engine-side connector face 61, two lugs 63 projecting from the engine-side connector face 61, a pair of guiding members 65 disposed at opposite sides of the engine-side connector face 61 and a locking bracket 66. Each lug 63 has a roller 64 attached at a distal end thereof and functions as a follower.

In reference to FIGS. 10-13, the test-side connector 80 comprises a test-side connector face 81 on which a plurality of test-side connections 82 are disposed. The test-side connector face 81 also comprises two apertures 94, a latch 86 and a pair of guiding passages 85 disposed at opposite sides of the test-side connector face 81. The passage 85 are defined by a passage opening 93, front rollers 90 and rear rollers 91. One of the passages 85 also comprises an inwardly tapered portion 92. The spacing between the front rollers 90 is greater than the spacing between the rear rollers 91.

Figure 12:
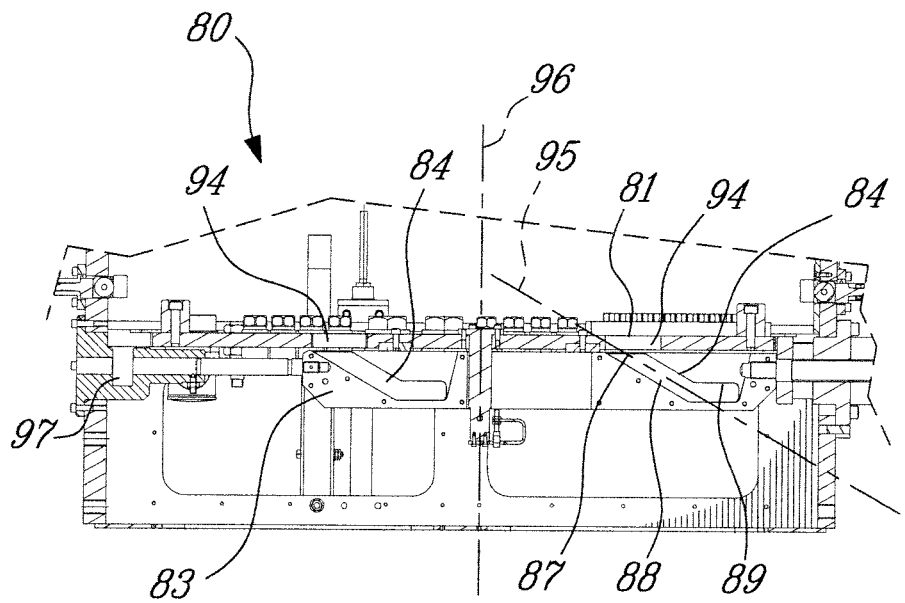
FIG. 12 is a cross-sectional view of the connector of FIG. 10 along line A-A of FIG. 10 wherein a keeper is in an unlocked position.
Figure 13:
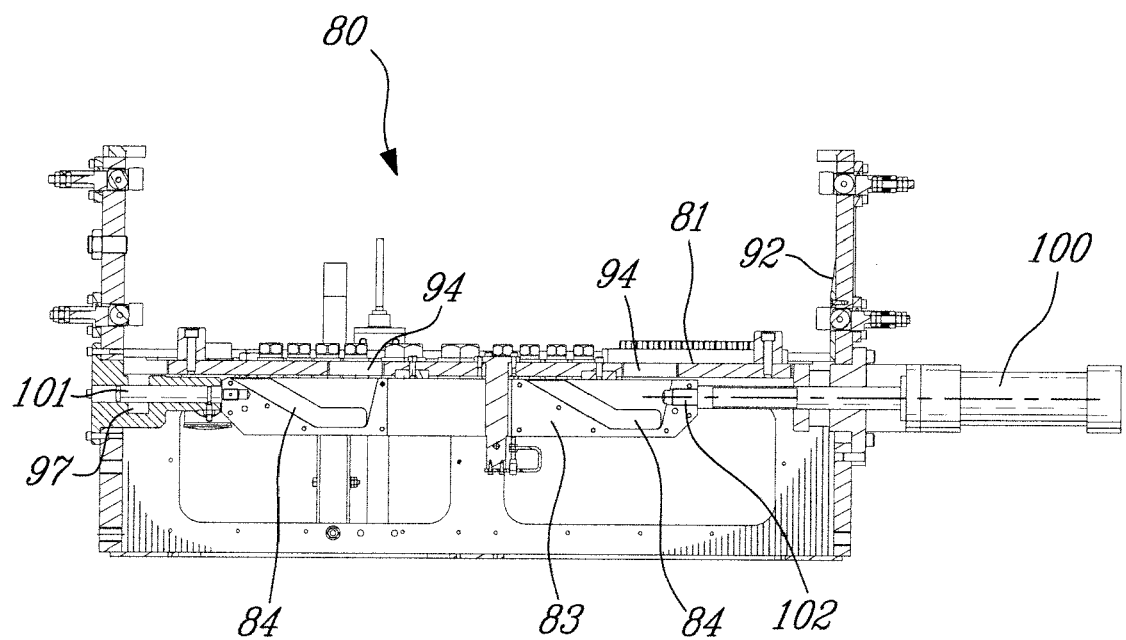
FIG. 13 is a cross-sectional view of the connector of FIG. 10 along line A-A of FIG. 10 wherein the keeper is in a locked position.

As shown in FIGS. 12 and 13, the test-side connector 80 further comprises two receiving apertures 97 and a movable keeper 83 disposed behind the test-side connector face 81 that is linearly movable between an unlocked and a locked position. The keeper 83 is actuated by a linear actuator 100 (FIG. 13) which may be a pneumatic or hydraulic cylinder, a screw drive or the like. FIG. 12 shows the keeper 83, in the unlocked position and FIG. 13 shows the keeper 83 in the locked position. The keeper 83 has two channels 84, each having a channel opening 87, a first channel portion 88 and a second channel portion 89. The first channel portion 88 has a tangential vector 95 that is at an angle from an engagement axis 96 of the test-side connector 80.

When the keeper 83 is in the unlocked position, the channel openings 87 are aligned with the apertures 94 and when the keeper 83 is in the locked position, the channel openings 87 are laterally offset relative to the apertures 94.

Once the engine 10 has been pre-dressed on the pre-dressing unit 20, the pre-dressing unit 20 is transported to the test cell. The support frame 30 together with the pre-dressed engine 10 and the base 50 and the engine-side connector 60 is then connected to the corresponding test-cell connector 80 within the test cell. The base 50 is disengaged from the support frame 30 by lowering the test cell lift platform. As the base 50 connecting shaft 54 disengage from support frame 30, the safety redundant latch 86 shown in FIG. 10 also becomes engaged to the locking bracket 66 shown in FIG. 9 and thereby positively locks the engine-side connector 60 and the test-side connector 80 together. The base 50 is removed from test cell prior engine testing.

The engine-side connector 60 is structurally attached to the support frame 30 so that in addition to providing a functional interface to the test equipment of the pre-dressing unit 20, the engine-side connector 60 also allows the engine 10 and the support frame 30 to be physically supported within the test cell during the pass-off test. Thus, the engine-side connector 60 and the test-side connector 80 provide a complete unitary interface between the test cell and the gas turbine engine 10 and allow the engine to be functionally and physically connected to the test cell all at once in a single sequence.

In order to ensure proper connection of the plurality of engine-side connections 62 on the engine-side connector 60 to the corresponding test-side connections 82 on the test-side connector 80, the connector assembly is provided with a cooperating guiding mechanism which is described in more details below.

Further, the engine-side connector 60 must also be securely connected to the test-side connector 80 during testing in order to physically support the engine 10 and simultaneously maintain functional connections between the test cell and the test equipment. The connector assembly must be able to withstand the forces that result from the thrust produced by the engine 10 during testing. Accordingly, the connector assembly is also provided with a cooperating locking mechanism which prevents the disconnection of the engine-side connector 60 and the test-side connector 80 once they have been connected.

The guiding mechanism and the locking mechanism will be described in reference to FIGS. 14A-14D. FIGS. 14A-14D show the engine-side connector 60 and the test-side connector 80 at various stages of engagement leading to their secure connection.

Figure 14A:
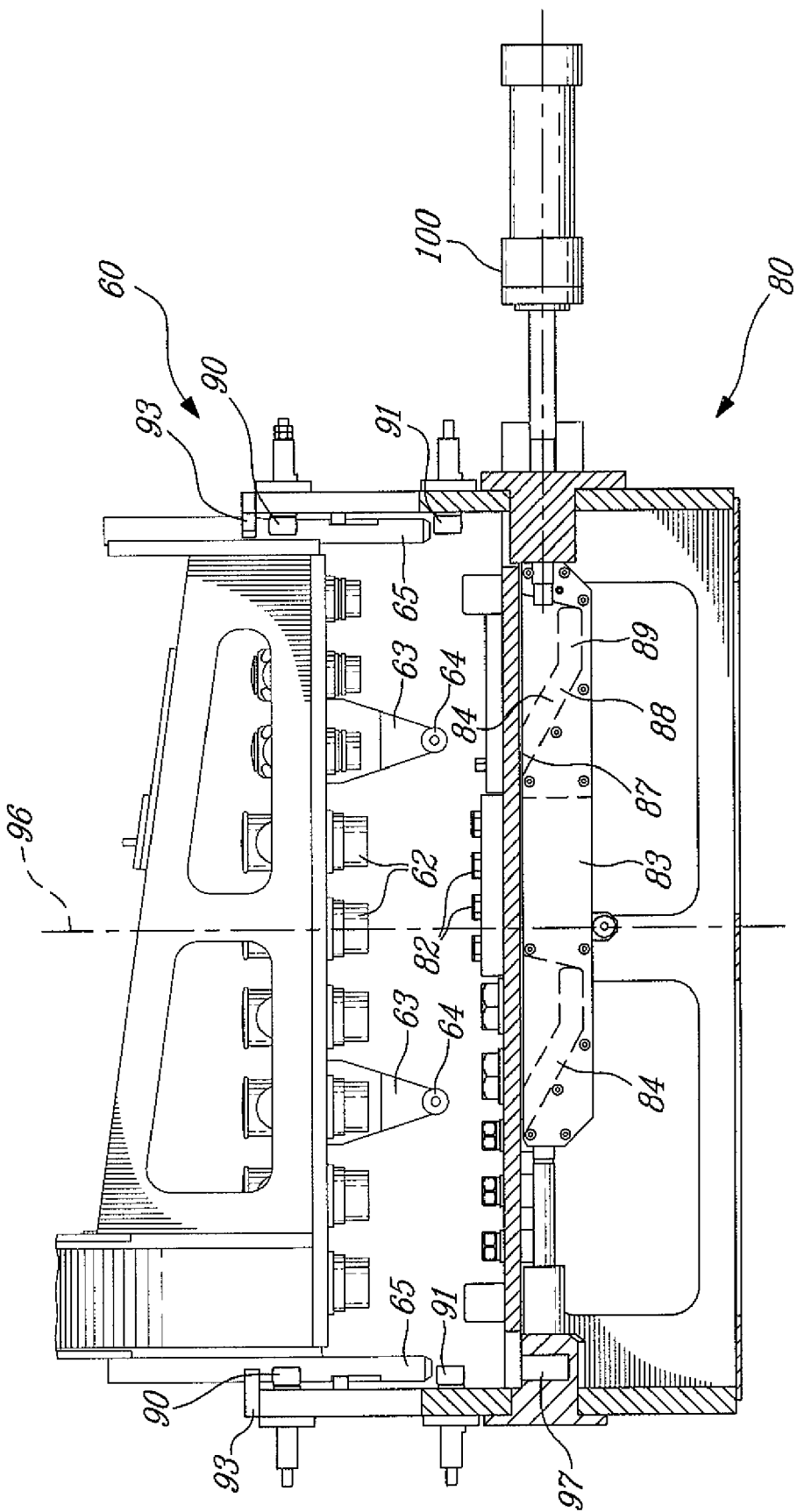
FIGS. 14A to 14D are horizontal cross-sectional views of the test-side connector of FIG. 10 together with the engine-side connector of FIG. 9, showing the sequential steps of connecting the engine-side connector and the test-side connector together.

In FIG. 14A, the connector assembly is at an initial stage of engagement wherein the guiding members 65 of the engine-side connector 60 have entered their corresponding passages 85 in the test-side connector 80 and have passed the front rollers 90. At this stage, coarse alignment of the engine-side connections 62 and test-side connections 82 is established. As the guiding members 65 proceed further into the passages 85 and come in contact with the rear rollers 91, finer alignment is achieved. The space between the rear rollers 91 is less than that of the front rollers 90 and therefore the width of the passage 85 is reduced at the rear of the passage 85. The guide members 65 and the corresponding passage 85 essentially restrict the relative motion between the engine-side connector 60 and the test-side connector 80 along an engagement axis 96.

Figure 14B:
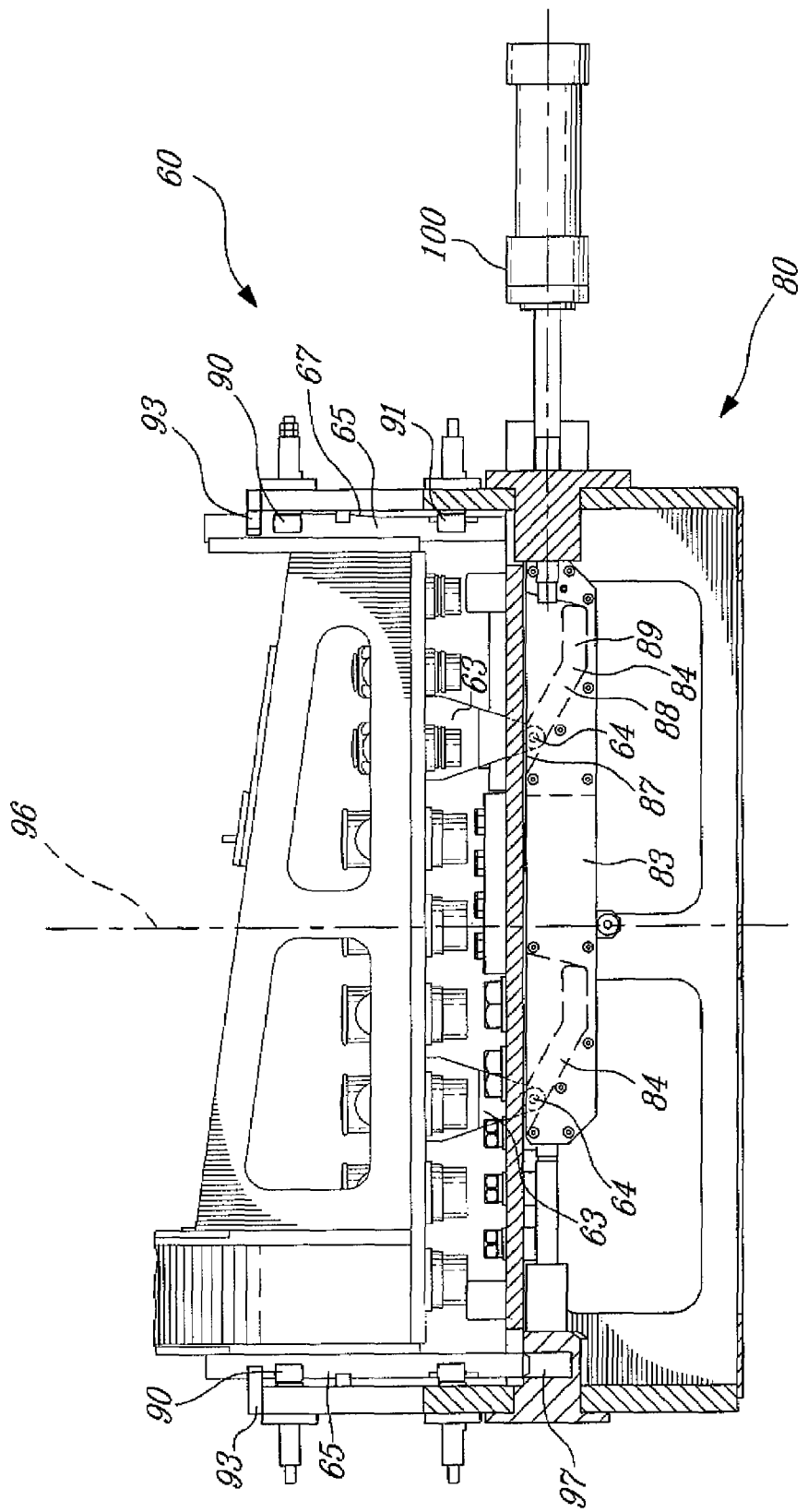

In FIG. 14B, the engine-side connector 60 and the test-side connector 80 are closer together. At this stage the guiding members 65 have passed the rear rollers 91 and the engine-side connections 62 are in substantial alignment with the test-side connections 82 and are therefore ready to be connected together. At this stage of engagement, the rollers 64 on the lugs 63 have also passed through their corresponding apertures 94 in the test-side connector face 81 and have entered the channels 84 in the keeper 83 via the channel openings 87. The keeper 83 is shown in the unlocked position wherein the channel openings 87 are aligned with their corresponding apertures 94.

Figure 14C:
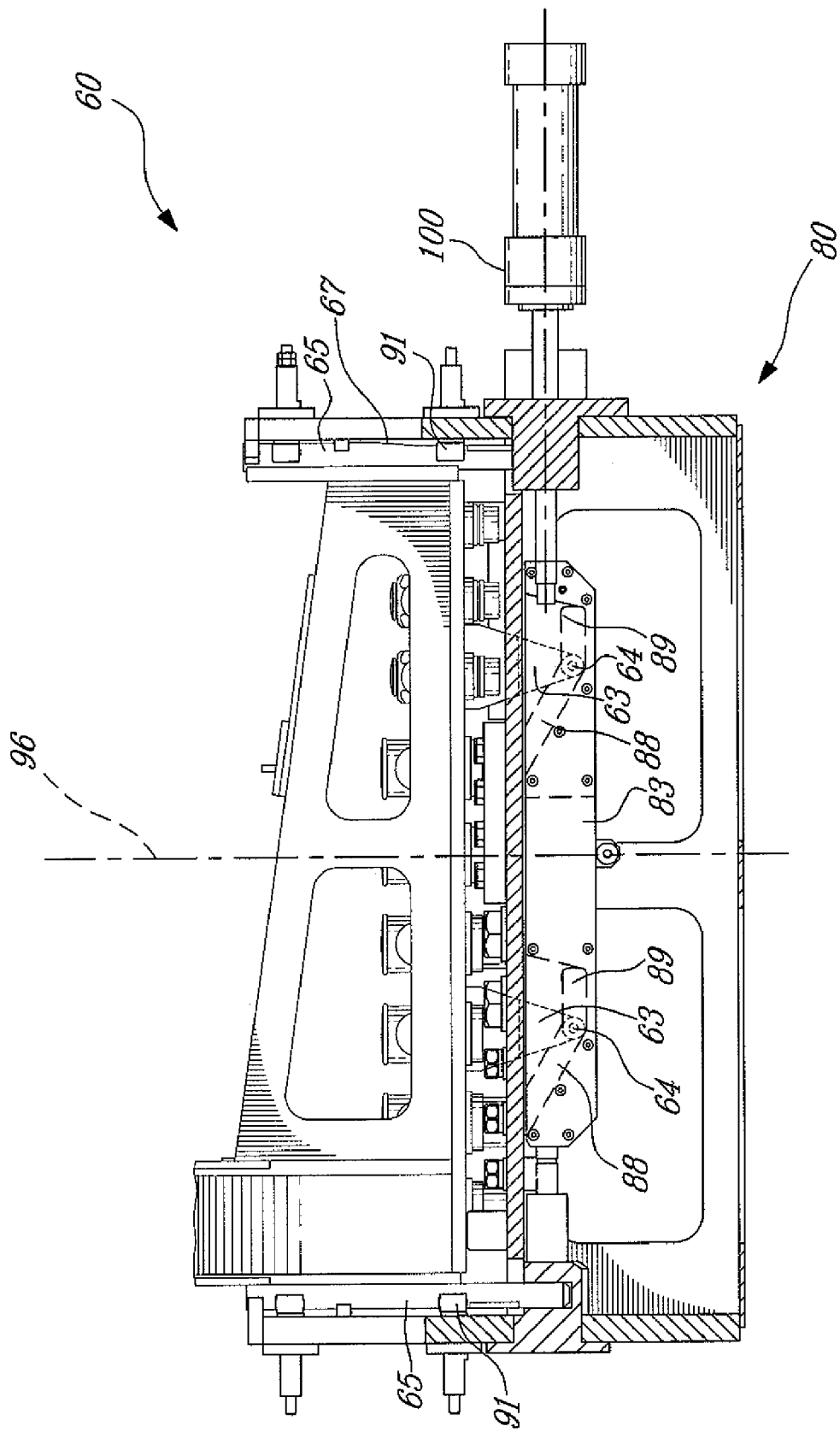

The next step is shown in FIG. 14C where the keeper 83 is moved towards the locked position by the linear actuator 100. The rollers 64 are engaged by the first channel portions 88 which have a tangential vector 95 at an angle from the engagement axis 96. The movement of the keeper 83 induces a camming action on the rollers 64 which causes the rollers 64 to be pulled inward along the engagement axis 96 and thereby causes the engine-side connector 60 and the test-side connector 80 to become connected together. Accordingly, any connection forces that may be needed to functionally connect the engine-side connections 62 to the test-side connections 82 is exerted by the actuator 100 through the keeper 83 and not by the operator 21. This ensures a consistent connection between the engine-side connector 60 and the test-side connector 80 which is not dependent on operator judgment or physical strength.

Figure 14D:
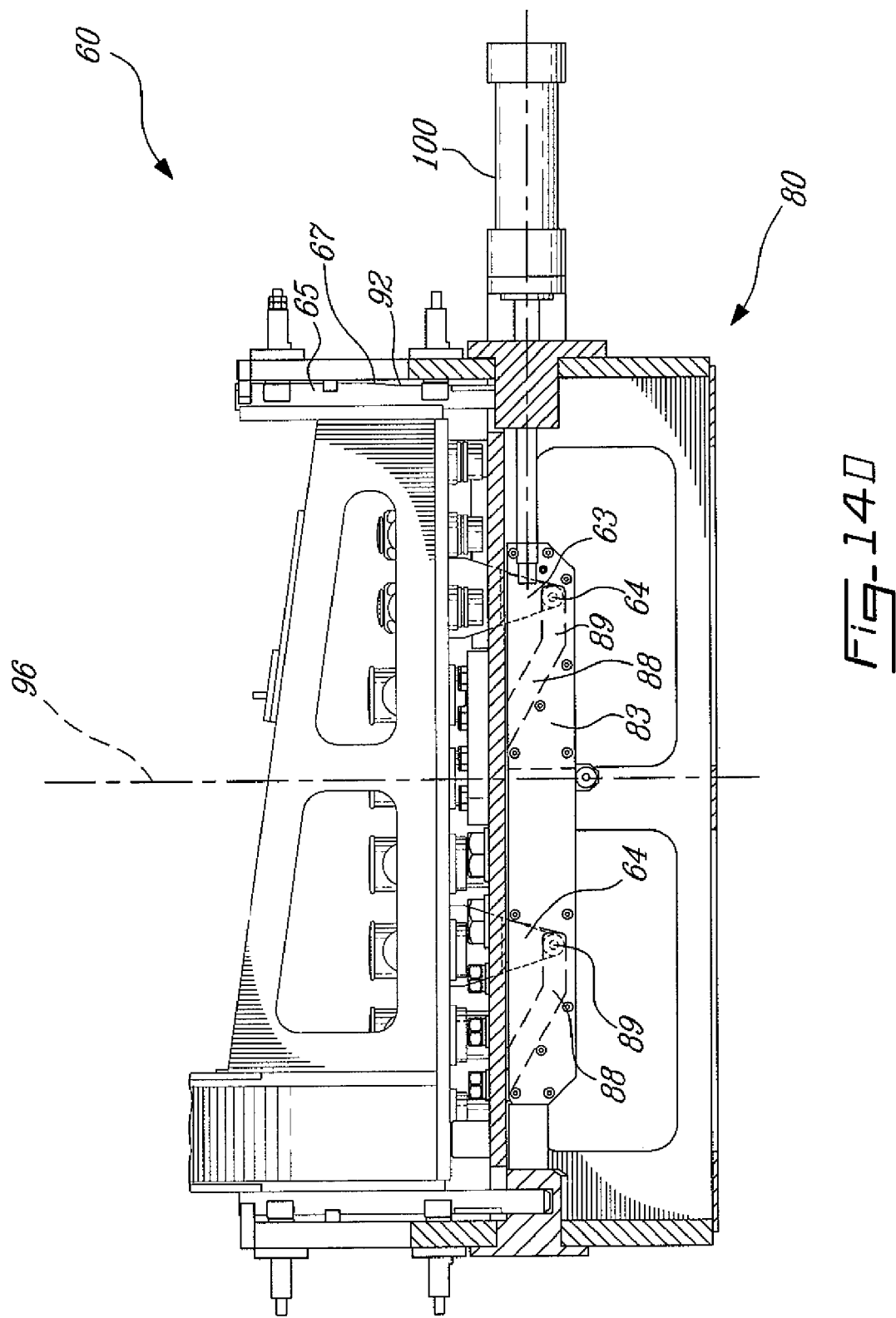

Also, as the engine-side connector 60 and the test-side connector 80 become connected together, the distal ends of the guiding member 65 enter the receiving aperture 97 of the test-side connector 80, and, the outwardly tapered portion 67 on the opposite guiding member 65 becomes in contact with the corresponding inwardly tapered portion 92 in the passage 85. This produces a firm fit between the engine-side connector 60 and the test-side connector 80. The final step is shown in FIG. 14D and involves further movement of the keeper 83 towards the locked position. This second channel portion 89 of the channel 84 is oriented in a direction that is perpendicular to the engagement axis 96 and therefore no camming action on the roller 64 is induced at this stage. This final sequence engages the nose pin 101 into the guide member hole 65A and the cylinder shaft 102 into the guide member hole 65B to complete the engagement.

At the completion of the engine pass-off test, the base 50 is engaged into the support frame 30 by raising the lift platform, this action also disengage the redundant safety latch 86. Then, the keeper 83 is moved towards the unlocked position by the linear actuator 100 whereby the nose pin 101 and cylinder shaft 102 exit the guide members holes 65A and 65B and the rollers 64 becomes once again engaged by the first channel portions 88 of the channel 84. The movement of the keeper 83 induces a camming action on the rollers 64 which causes the rollers 64 to be pushed outward along the engagement axis 96 and thereby causes the engine-side connector 60 and the test-side connector 80 to become disconnected from each other. Accordingly, the force that may be needed to functionally disconnect the engine-side connections 62 from the test-side connections 82 is exerted by the actuator 100 through the keeper 83 and not by the operator 21. The engine-side connector 60 and the test-side connector 80 can then be freely separated from each other along the engagement axis 96 until the guide members 65 exit the passages 85.

Once the engine-side connector 60 and the test-side connector 80 are disconnected and upon a successful completion of the pass-off test, the pre-dressing unit 20 is transported to a shipping and packaging area of the production facility where the engine is undressed, packaged and shipped to the customer.

The locking mechanism shown in this embodiment comprises a keeper 83 and channel configuration adapted for linear motion of the keeper 83, however, one of ordinary skill in the art would appreciate that other configurations are also possible. The proposed keeper is a compact system which pulls with tandem pullers to insure parallel movement against uneven reaction force of connector friction and spring resistance. It is a double function system, pulling/pushing and additional massive locks in the same sequence. Alternatively, a ratchet mechanism could also be used to progressively lock the connector assembly as the engine-side connector 60 and the test-side connector 80 are brought together.

Referring again to FIG. 2, the engine oil pressure regulator 39 is preferably an electric motor (not shown) having a suitable control system (not shown) which communicates with the motor through the data interface of connectors 60-80. The engine oil pressure regulator 39 allows test cell operators to adjust the oil pressure "on the fly" during engine operation in the test cell, without having to stop the engine and make the changes manually. The above description is meant to be exemplary only, and one skilled in the art will recognize that changes may be made to the embodiments described without departing from the scope of the invention disclosed. Although the above description relates to a pre-dressing unit 20 having a side-mounted engine-side connector 60, the pre-dressing unit 20 could be adapted to have a top-mounted engine-side connector. The pre-dressing unit could also be adapted to be transported using an overhead (or other) trolley transport system instead of a mobile base. It is also apparent that the pre-dressing unit described above can be fabricated using any suitable techniques, including conventional manufacturing procedures using a suitable material(s) such as a structural grade steel or any combinations of suitable materials. It will also be understood that the apparatus is modifiable to apply to other types of gas turbine engines, such as a turboshaft, a turboprop, and auxiliary power units. Still other modifications which fall within the scope of the present invention will be apparent to those skilled in the art, in light of a review of this disclosure, and such modifications are intended to fall within the appended claims.

I claim:

1. A pre-dressing unit for preparing an aircraft turbofan engine for testing in a test cell, the pre-dressing unit comprising:
a support frame including an engine mount;
an intake duct supported by the support frame and configured to mount to an intake end of the turbofan engine;
an exhaust duct supported by the support frame and configured to mount to an exhaust end of the turbofan engine;
an engine-side data connector mounted to the support frame and having a functional data interface comprising a plurality of engine-side data connections; and
equipment carried by the support frame and associated with the operation and testing of the engine, said equipment including test instruments mounted to the exhaust duct and functionally connected to a corresponding engine-side connection on the engine-side data connector for data communication therewith, the engine-side data connector providing a common output connection interface for the equipment on the support frame.

2. A pre-dressing unit according to claim 1, wherein the support frame is removably mounted to a base, and wherein the engine mount is provided on one side of the support frame to permit side-mounting of the turbofan engine to the support frame.

3. A pre-dressing unit according to claim 2, wherein the base includes an upstanding support post, and wherein the support frame is removably mounted to an upper end of said support post.

4. A pre-dressing unit according to claim 1, wherein the intake duct and exhaust duct are movable towards and away from each other.

5. A pre-dressing unit according to claim 4, wherein the support frame comprises a horizontal rail, and wherein at least one of said intake and exhaust ducts is slidably mounted to said horizontal rail.

6. A pre-dressing unit according to claim 1, wherein the engine-side data connector is structurally attached to the support frame and is provided with structural connectors to physically support the engine within the testing facility when the engine-side data connector is connected to a corresponding test-side connector associated with the testing facility.

7. A pre-dressing unit according to claim 1, wherein the equipment are selected from the group consisting of: a starter motor, an engine oil pressure regulator, a pressure sensor, a temperature sensor, a fuel supply line and an oil supply line.

8. A pre-dressing unit according to claim 1, wherein the intake duct and the exhaust duct are supported by a rail fixedly mounted to said engine-side data connector.

9. A pre-dressing unit for preparing an aircraft turbofan engine for testing in a test cell, the pre-dressing unit comprising:
a support frame including an engine mount;
an intake duct supported by the support frame and configured to mount to an intake end of the turbofan engine;
an exhaust duct supported by the support frame and configured to mount to an exhaust end of the turbofan engine;
an engine-side data connector mounted to the support frame and having a functional data interface comprising a plurality of engine-side data connections; and
equipment associated with the operation and testing of the engine, said equipment including an engine oil pressure regulator carried by the support frame and functionally connected to a corresponding engine-side connection on the engine-side data connector for allowing adjustment of oil pressure during engine testing operation without having to stop the engine, the equipment having a common data output on said functional data interface of the engine-side data connector.

10. A pre-dressing unit according to claim 9, wherein the support frame comprises a rail on which at least one of the intake duct and the exhaust duct is movably supported.

11. A pre-dressing unit according to claim 9, wherein the equipment further comprises a part selected from the group consisting of: a starter motor, a pressure sensor, a temperature sensor, a fuel supply line and an oil supply line.

12. A pre-dressing unit according to claim 9, wherein the support frame is removably mounted to a mobile base.

13. A pre-dressing unit according to claim 9, wherein the engine mount is provided on a side of said engine-side data connector opposite to said functional data interface.

14. A pre-dressing unit according to claim 9, wherein the engine-side data connector further comprises structural connections to physically mount the pre-dressing unit to the test cell, and wherein the structural connections are provided on the functional data interface together with the engine-side data connections to permit the structural connections and the engine-side data connections to be interfaced all at once in a single operation with corresponding data and structural connectors of the test cell.

* * * * *